(12) United States Patent
Morimoto (10) Patent No.: US 12,399,408 B2
(45) Date of Patent: Aug. 26, 2025

(54) LIQUID CRYSTAL DISPLAY DEVICE

(71) Applicant: Magnolia White Corporation, Tokyo (JP)

(72) Inventor: Masateru Morimoto, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/605,942

(22) Filed: Mar. 15, 2024

(65) Prior Publication Data
US 2024/0353721 A1 Oct. 24, 2024

(30) Foreign Application Priority Data
Apr. 24, 2023 (JP) .................................. 2023-070588

(51) Int. Cl.
*G02F 1/1362* (2006.01)
*G02F 1/1343* (2006.01)

(52) U.S. Cl.
CPC ...... *G02F 1/136286* (2013.01); *G02F 1/1343* (2013.01); *G02F 1/136213* (2013.01)

(58) Field of Classification Search
CPC ........... G02F 1/13685; G02F 1/134363; G02F 1/134372; G02F 1/136286; G02F 1/1343; G02F 1/136213
See application file for complete search history.

(56) References Cited

U.S. PATENT DOCUMENTS

2020/0064668 A1* 2/2020 Liang .................. H01L 27/1259
2021/0109412 A1* 4/2021 Suzumura ......... G02F 1/136286

FOREIGN PATENT DOCUMENTS

JP 2018-72537 A 5/2018

\* cited by examiner

*Primary Examiner* — James A Dudek
(74) *Attorney, Agent, or Firm* — Michael Best & Friedrich LLP (57) ABSTRACT

The purpose of the invention is to improve the reliability of insulation between the video signal line and the source electrode in a liquid crystal display device. The configuration is: A liquid crystal display device in which a first video signal line, a second video signal line and a source electrode are on a first interlayer insulating film; a second interlayer insulating film is formed over the first video signal line, the second video signal line, and the source electrode; a relay electrode connected to the source electrode is formed on the second interlayer insulating film, an organic passivation film is formed over the second interlayer insulating film, a capacitance insulating film is formed over the organic passivation film, and the pixel electrode is formed in a first through hole formed in the organic passivation film; the pixel electrode is connected to the relay electrode in the first through hole.

8 Claims, 14 Drawing Sheets

LIQUID CRYSTAL DISPLAY DEVICE

CLAIM OF PRIORITY

The present application claims priority from Japanese Patent Application JP 2023-070588 filed on Apr. 24, 2023, the content of which is hereby incorporated by reference into this application.

BACKGROUND OF THE INVENTION

(1) Field of the Invention

This invention relates to a high-definition liquid crystal display device.

(2) Description of the Related Art

In a liquid crystal display device, a (thin-film transistor) TFT substrate on which pixels having pixel electrodes and TFTs, etc., are formed in a matrix, and an opposing substrate is arranged opposite to the TFT substrate, and liquid crystal is sandwiched between the TFT substrate and the opposing substrate. The image is formed by controlling the transmittance of light from the backlight by liquid crystal molecules in each pixel.

In liquid crystal displays, such as virtual reality (VR) display devices (hereinafter referred to as VR), it is necessary to make the pixel pitch extremely small. In line with this, the width of the wiring also needs to be reduced and the spacing between the wiring becomes small. In order to reduce the pixel pitch, a configuration in which the width of the source electrode connected to the TFT is reduced to the same level as the width of the video signal lines is described in Patent Document 1.

Patent Document [1]: Japanese Patent Application Laid Open No. 2018-72537

SUMMARY OF THE INVENTION

The horizontal pixel pitch of a high-definition liquid crystal display (LCD) called Full HD (Full High Definition) is as small as 20 to 30 μm, while the horizontal pixel pitch of a virtual reality (VR) display is as small as 8 μm.

In this case, it is necessary to reduce the line width of the wiring and the spacing between the wirings. When the spacing between wirings becomes small, the insulation characteristics between the wirings become problematic. In addition, while the line width of the wiring is reduced, the thickness of the wiring must be increased due to the problem of wiring resistance.

The problem of the present invention is to realize a display device with high reliability in a high-definition liquid crystal display with a small pixel pitch, while maintaining image quality and the insulation characteristics between the wirings.

The present invention overcomes the above problems, and the representative means of the invention are as follows.

(1) A liquid crystal display device including: a thin-film transistor having a semiconductor film formed between a first video signal line and a second video signal line; and a first end of the semiconductor film, the first end being connected to the first video signal line, and a second end of the semiconductor film, the second end being connected to a source electrode; the first video signal line, the second video signal line, and the source electrode being present on a first interlayer insulating film; the source electrode being connected to a pixel electrode and being exists between the first video signal line and the second video signal line. In the liquid crystal display device, a second interlayer insulating film is formed over the first video signal line, the second video signal line, and the source electrode, a relay electrode connected to the source electrode is formed on the second interlayer insulating film, an organic passivation film is formed over the second interlayer insulating film, a capacitance insulating film is formed over the organic passivation film, and the pixel electrode provided between the organic passivation film and the capacitance insulating film is formed in a first through hole formed in the organic passivation film, and the pixel electrode is connected to the relay electrode in the through hole.

(2) The liquid crystal display device according to (1), characterized in that the source electrode extends within the first through hole formed in the organic passivation film, and the second through hole formed in the second interlayer insulating film, which connects the source electrode and the relay electrode, exists within the first through hole formed in the organic passivation film.

(3) The liquid crystal display device according to (2), characterized in that the third through hole formed in the first interlayer insulating film, which connects the source electrode and the semiconductor film, exists outside of the first through hole formed in the organic passivation film in a plan view.

(4) A liquid crystal display device including: a thin-film transistor having a semiconductor film formed between a first video signal line and a second video signal line; and a first end of the semiconductor film, the first end being connected to the first video signal line, and a second end of the semiconductor film, the second end being connected to a source electrode; the first video signal line, the second video signal line, and the source electrode being present on a first interlayer insulating film, the source electrode being connected to a pixel electrode and being present between the first video signal line and the second video signal line. In the liquid crystal display device, a second interlayer insulating film is formed over the first video signal line, the second video signal line, and the source electrode, an organic passivation film is formed over the second interlayer insulating film, a capacitance insulating film is formed over the organic passivation film, a common electrode opposite to the pixel electrode is formed on the capacitance insulating film, and the pixel electrode provided between the organic passivation film and the capacitance insulating film is connected to the source electrode through a second through hole formed in the second interlayer insulating film, which is provided within a first through hole formed in the organic passivation film.

DETAILED DESCRIPTION OF THE PREFERRED EMBODIMENTS

The invention will be explained in detail by means of the following examples. In liquid crystal display devices, there are pixel electrode top and common electrode top systems, depending on the vertical relationship between the pixel electrode and the common electrode. Conventionally, color filters are often formed on the opposite substrate, but in high-definition LCDs, they are sometimes formed on the TFT substrate. This is called color filter on array COA. The present invention can be applied to either of these methods. In the embodiments, the case where the color filter is formed on the opposite substrate side will be described.

Embodiment 1

Figure 1:
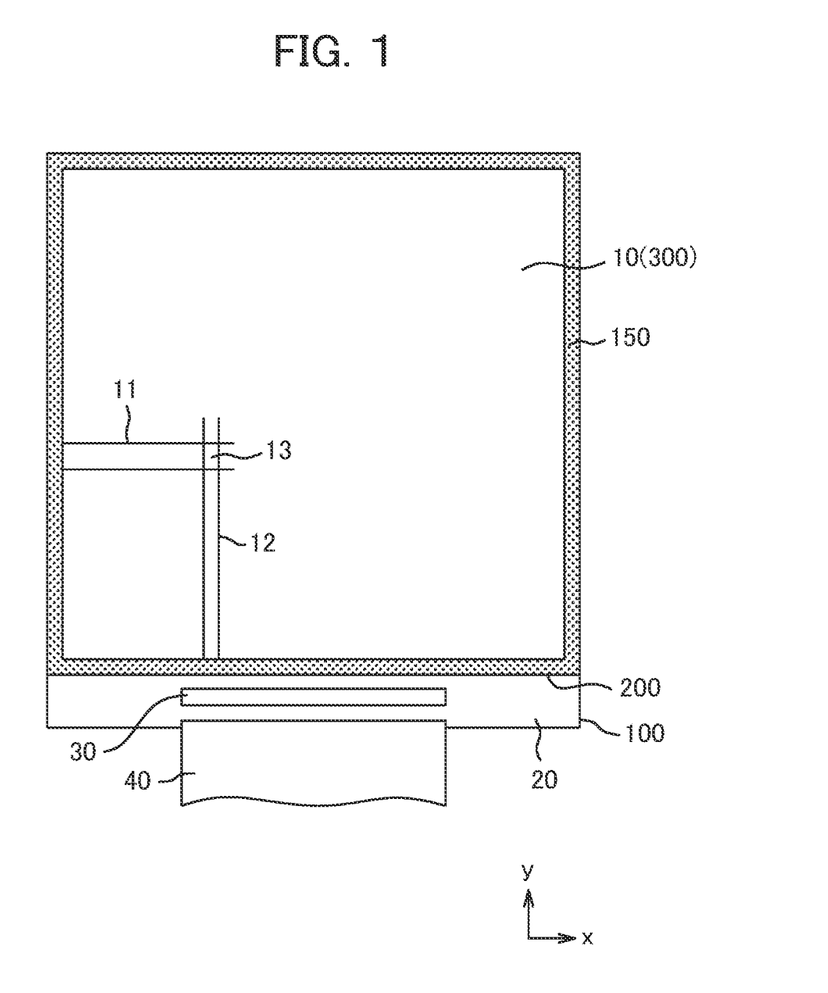
FIG. 1 is a plan view of the liquid crystal display device.

FIG. 1 is a plan view of a liquid crystal display device. In FIG. 1, a TFT substrate 100 and an opposing substrate 200 are bonded via a sealant 150 in the periphery and a liquid crystal 300 is sealed thereinside. A display area 10 is formed in the area where the TFT substrate 100 and the opposing substrate 200 overlap. In the display area 10 of the TFT substrate 100, scanning lines 11 extend in the horizontal direction (x direction) and are arranged in the vertical direction (y direction). In addition, video signal lines 12 extend vertically and are arranged in the horizontal direction. A pixel 13 is formed in the area surrounded by the scanning lines 11 and the video signal lines 12.

The TFT substrate 100 is formed larger than the opposite substrate 200, and the portion of the TFT substrate 100 not overlapping the opposite substrate 200 is a terminal area 20. The terminal area 20 is connected to a flexible wiring substrate 40 for supplying power and signals to the liquid crystal display device. In the terminal area 20, a driver IC 30 for forming video signals and the like is located. If the area of the terminal area 20 is small, the driver IC 30 may be mounted on the flexible wiring substrate 40.

Figure 2:
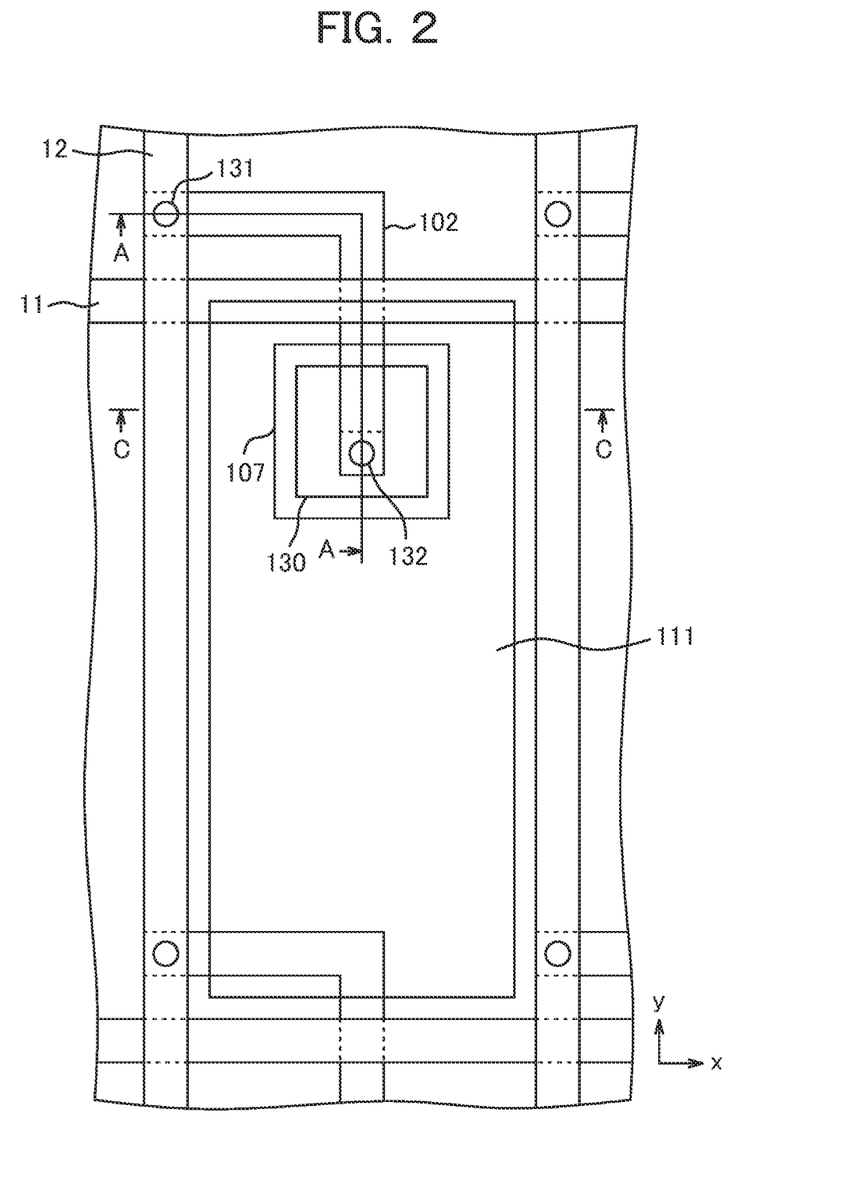
FIG. 2 is a plan view of the pixel portion of the liquid crystal display device according to Comparative Example 1.

FIG. 2 is a plan view of a pixel area with a TFT using a polysilicon semiconductor in a liquid crystal display device according to Comparative Example 1. In the present invention, a polysilicon semiconductor is used as the semiconductor. Hereafter, unless otherwise specified, when a semiconductor film is referred to, it refers to a polysilicon semiconductor film.

In FIG. 2, scanning lines 11 extend in the horizontal direction (x direction) and are arranged in the vertical direction (y direction). The video signal lines 12 extend vertically and are aligned horizontally. A rectangular pixel electrode 111 is formed in the area surrounded by the scanning lines 11 and the video signal lines 12.

A semiconductor film 102 is connected to the video signal line 12 through a through hole 131. The semiconductor film 102 extends in the horizontal direction, then bends in an L-shape and extends in the vertical direction. The area where the semiconductor film 102 passes under the scanning lines 11 forms the channel region of the TFT. The semiconductor film 102 extends further downward and is connected to a source electrode 107, which also serves as the contact electrode, via a through hole 132.

Figure 3:
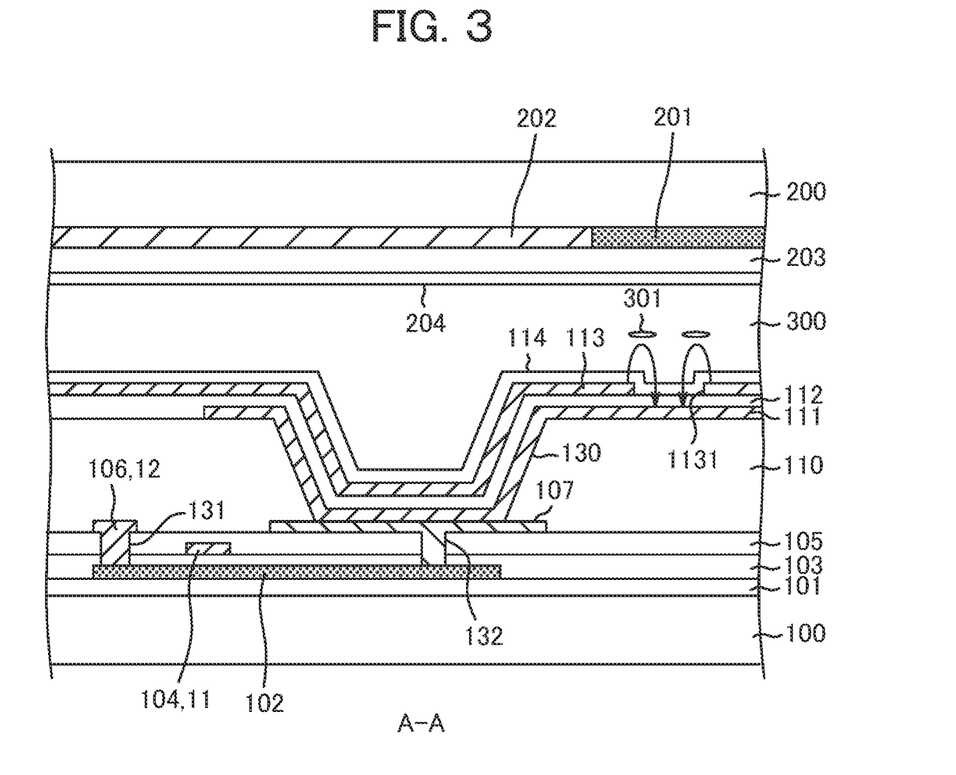
FIG. 3 is an A-A cross-sectional view of FIG. 2.

A through hole 130 in FIG. 2 is the bottom of a through hole formed in an organic passivation film 110 (see FIG. 3). Since the organic passivation film 110 is formed thick, such as 2 to 3 μm, the diameter of the through hole 130 becomes large. In FIG. 2, in the through hole 130, the semiconductor film 102 is connected to the source electrode 107, which also serves as a contact electrode, through the through hole 132. The source electrode 107 and the pixel electrode are connected in the through hole 130.

FIG. 3 is an A-A cross-sectional view of FIG. 2. In FIG. 3, a base film 101 is formed on a TFT substrate 100 formed of glass, for example. The role of the base film 101 is to prevent impurities from the glass substrate 100 and other materials from contaminating the semiconductor film 102. The base film 101 generally consists of two layers: a silicon nitride film (hereinafter maybe referred to as a SiN film) and a silicon oxide film (hereinafter maybe referred to as a SiO film).

The semiconductor film 102 is formed on the base film 101. The polysilicon that constitutes the semiconductor film 102 in FIG. 2 is a-silicon (amorphous silicon) converted to polysilicon by an excimer laser.

A gate insulating film 103 is formed over the semiconductor film 102. The gate insulating film 103 is, for example, made of TEOS and deposited by chemical vapor deposition (CVD). A gate electrode 104 is formed by metal on top of the gate insulating film 103. In FIGS. 2 and 3, the scanning lines 11 is used as the gate electrode 104. The semiconductor film 102 is doped with phosphorus or boron by ion implantation, but the area under the scanning line 11 (gate electrode 104) is not doped, and this area forms the channel region of the TFT.

A first interlayer insulating film 105 is formed over the gate electrode 104 and the gate insulating film 103. The first interlayer insulating film 105 is formed of a silicon oxide film or a silicon nitride film, or a laminated film of a silicon oxide film and a silicon nitride film. One end of the semiconductor film 102 is connected to the video signal line 12 by the through hole 131 formed in the gate insulating film 103 and the first interlayer insulating film 105. In FIG. 3, the video signal line 12 serves as a drain electrode 106 of the TFT. Another end region of the semiconductor film 102 is connected to the source electrode 107 via the through hole 132 formed in the gate insulating film 103 and the first interlayer insulating film 105. The source electrode 107 in FIG. 3 also serves as generally called contact electrode.

The organic passivation film 110 is formed over the drain electrode 106, the source electrode 107, and the first interlayer dielectric film 105. The organic passivation film 110 is formed of a transparent photosensitive resin such as acrylic. Through holes 130 are formed in the acrylic resin 110 to connect the pixel electrode 111 and the source electrode 107 of the TFT.

The organic passivation film 130 is formed thick, from 2 to 4 μm, in order to use it as a planarization film and to reduce the capacitance coupling between the video signal line 12 and the pixel electrode 111. This increases the diameter of the through holes 130 formed in this thick film.

The diameter of the through hole 130 is approximately the same size as the pixel pitch in the horizontal direction in a display device with a small horizontal pitch, such as a VR.

A pixel electrode 111 is formed on top of the organic passivation film 110 using an indium tin oxide (ITO) film, which is a transparent conductive film. The shape of the pixel electrode 111 is rectangular as shown in FIG. 2. A capacitance insulating film 112 is formed over the pixel electrode 111. The capacitance insulating film 112 is generally called because it serves to insulate the pixel electrode 111 from a common electrode 113 and to form the pixel capacitance. The capacitance insulating film 112 is formed with a silicon nitride film to increase the capacitance, and its thickness is less than 100 nm.

Covering the capacitance insulating film 112, the common electrode 113 is formed with an ITO film, which is a transparent conductive film. The common electrode 113 is formed in common for multiple pixels. A slit 1131 is formed at the portion where the common electrode 113 faces the pixel electrode 111. When voltage is applied to the pixel electrode 111, as shown in FIG. 3, lines of electric force passing through the liquid crystal layer 300 and through the slit 1131 toward the common electrode 113 are generated, causing liquid crystal molecules 301 to rotate. The amount of rotation of the liquid crystal molecules 301 controls the light transmittance of each pixel.

An alignment film 114 is formed over the common electrode 113. This is to initially orient the liquid crystal molecules 301. The orientation treatment of the alignment film 114 is performed by rubbing the surface of the alignment film 114 in one direction with a cloth or the like, generally called rubbing treatment, or photo-alignment treatment. The photo-orientation treatment uses deflecting ultraviolet light to break up the polyimide chains in a specific direction and give the alignment film 114 a uniaxial anisotropy. In the IPS structure shown in FIG. 3, the generally called tilt angle is not necessary, so that the photo-alignment treatment is suitable.

In FIG. 3, the opposing substrate 200 is placed covering the liquid crystal layer 300. On the opposing substrate 200, a color filter 201 and a black matrix 202 are formed. The black matrix 202 is formed to cover areas that need light shielding, such as the through holes 130, the video signal lines 12, and the scanning lines 11. The color filter 201 is formed in the area corresponding to the pixel electrode 111. An overcoat film 203 is formed over the color filter 201 and the black matrix 202. The overcoat film 203 is formed of a transparent resin such as acrylic. An alignment film 204 is formed over the overcoat film 203. The alignment film 204 determines the initial orientation direction of the liquid crystal molecules 301, and the manufacturing method, etc., is the same as that described for the alignment film 114 on the TFT substrate 100 side.

Figure 4:
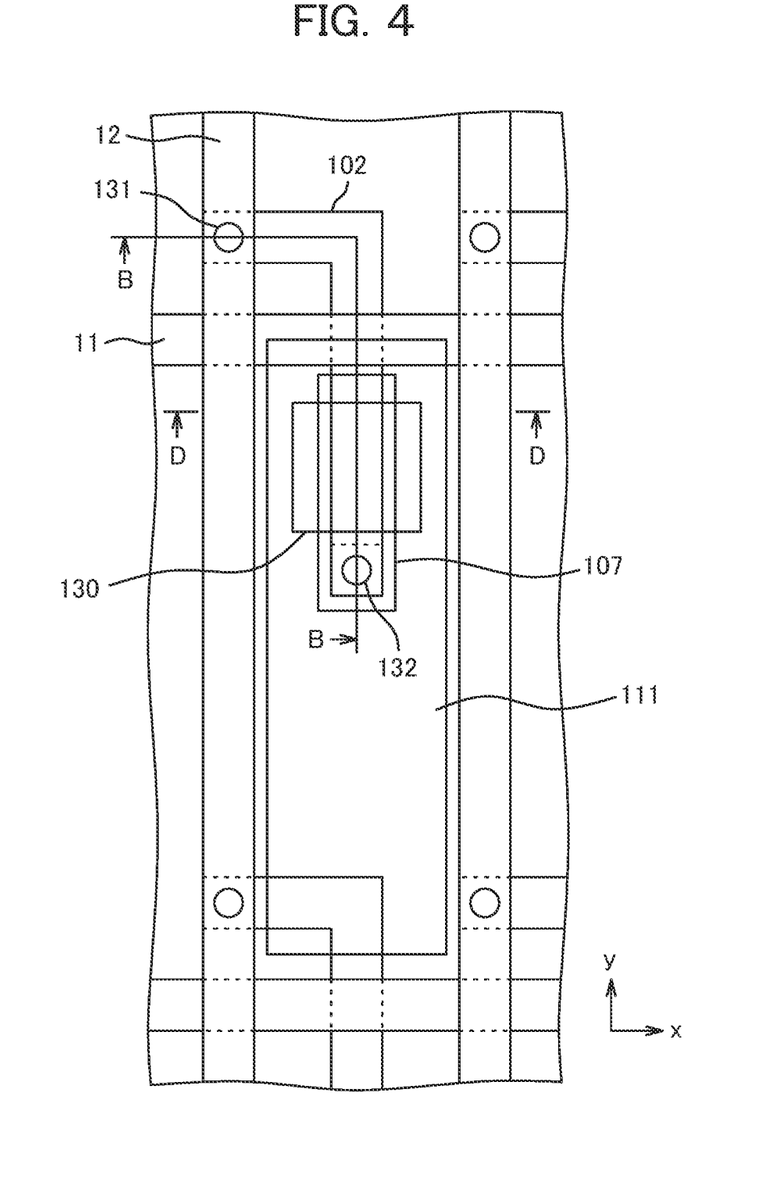
FIG. 4 is a plan view of the pixel of the liquid crystal display device according to Comparative Example 2.

FIG. 4 is a plan view of a pixel when the pixel pitch is reduced. The pixel pitch in FIG. 2 is approximately 20 μm, for example, while the pixel pitch in FIG. 4 is approximately 8 μm, for example. As the pixel pitch becomes smaller, the width of the source electrode 107 in the horizontal direction also needs to be reduced. Accordingly, the diameter of the through hole 130 formed in the organic passivation film 110 is slightly smaller. The width of the source electrode 107 is significantly smaller in FIG. 4 than in FIG. 2. The through hole 132 connecting the source electrode 107 and the semiconductor film 102 is formed outside of the through hole 130. The other configurations in FIG. 4 are the same as those in FIG. 2.

Figure 5:
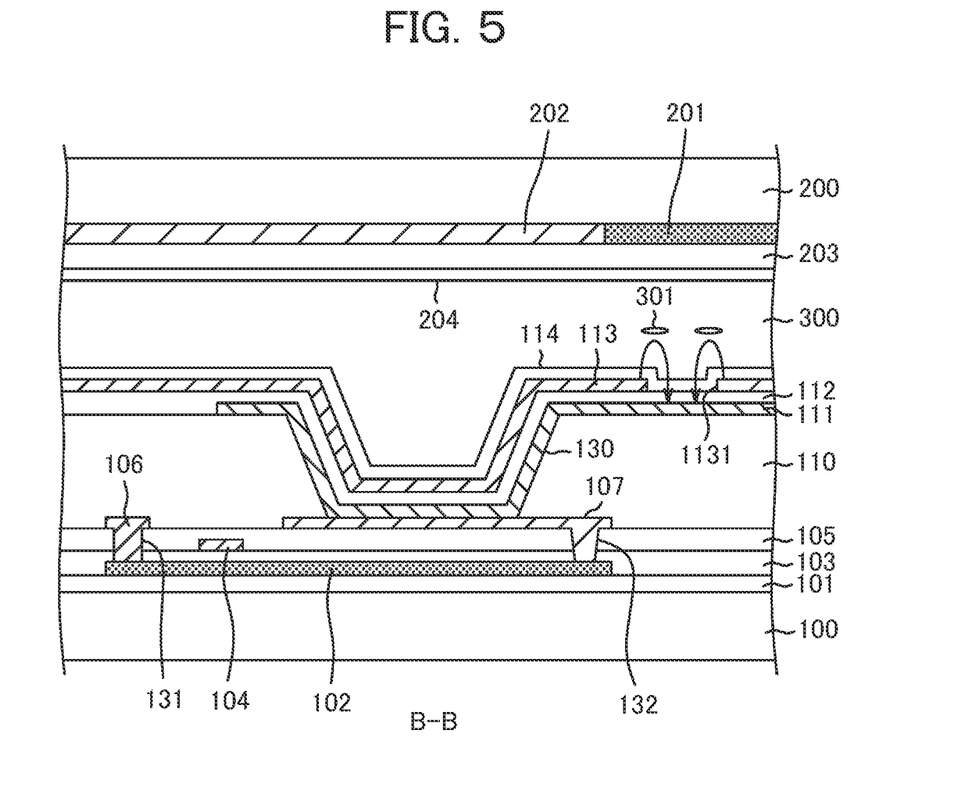
FIG. 5 is a B-B cross-sectional view of FIG. 4.

FIG. 5 is a B-B cross-sectional view of FIG. 4. In FIG. 5, the through hole 132 connecting the source electrode 107 and the semiconductor film 102 is formed outside of the through hole 130. The other structures in FIG. 5 are the same as those described in FIG. 4.

Figure 6:
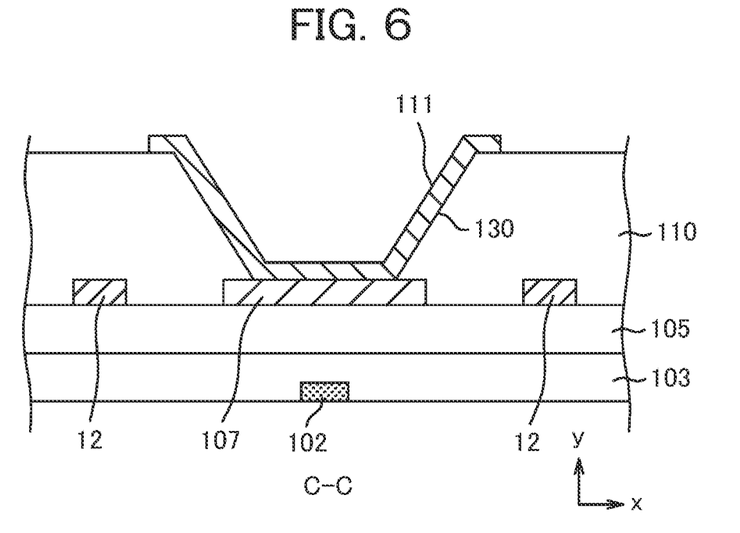
FIG. 6 is a C-C cross sectional view of FIG. 2.

FIG. 6 is a C-C cross-sectional view of FIG. 2. In FIG. 6, a semiconductor film 102 is formed on top of the base film 101, the gate insulating film 103 is formed on top of the semiconductor film 102, and the first interlayer insulating film 105 is formed on top of the gate insulating film 103. The video signal line 12 and the source electrode 107 are formed on the first interlayer insulating film 105. In FIG. 6, through holes 130 are formed in the thickly formed organic passivation film 110. The through holes 130 exist between the video signal lines 12 and the video signal lines 12. The pixel electrodes 111 are formed along the side and bottom surfaces of the through holes 130. The source electrode 107 is present on the bottom surface of the through hole 130 and is connected to the pixel electrode 111. In FIG. 6, the width of the source electrode is larger than the width of the bottom surface of the through hole 130. Nevertheless, the distance between the video signal line 12 and the source electrode 107 is sufficient.

Figure 7:
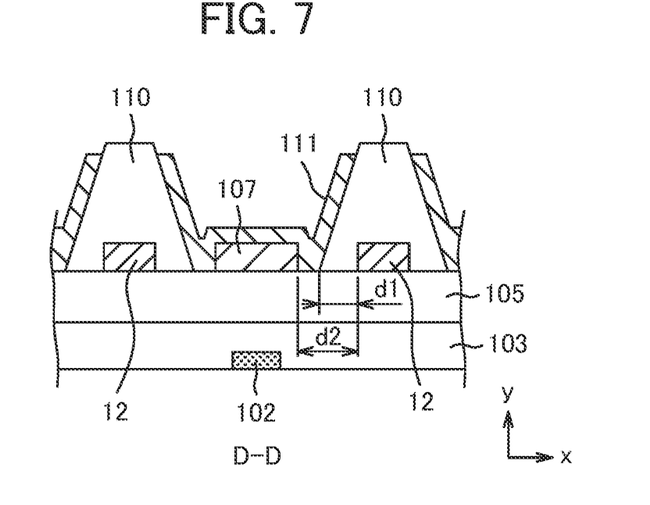
FIG. 7 is a D-D cross-sectional view of FIG. 4.

FIG. 7 is a D-D cross-sectional view of FIG. 4. In FIG. 7, the basic structure is almost the same as that in FIG. 6, although the spacing between the video signal lines 12 and the video signal lines 12 is smaller. In FIG. 7, however, the width of the source electrode 107 is smaller. Nevertheless, when the pixel pitch is very small, the interval d2 between the source electrode 107 and the video signal line 12 becomes small, making it difficult to maintain mutual insulation. Furthermore, since the interval d1 between the video signal line 12 and the pixel electrode 111 is smaller than the interval d2 between the video signal line 12 and the source electrode 107, it makes even more difficult to maintain insulation.

Figure 8:
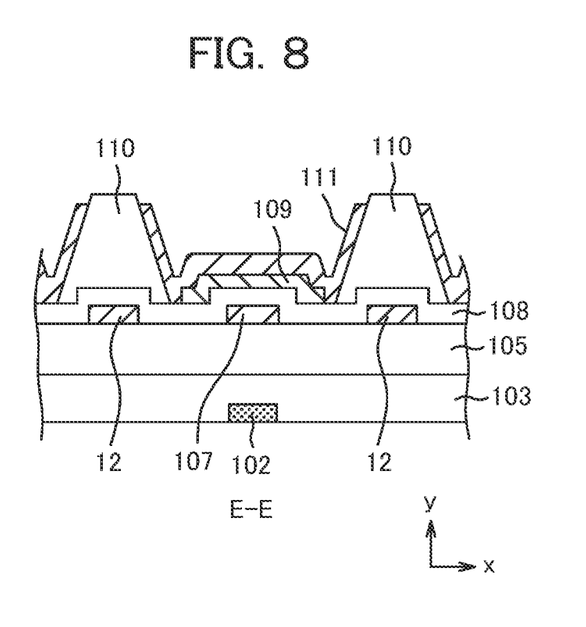
FIG. 8 is a cross-sectional view of the invention (E-E cross sectional view of FIG. 9 in Embodiment 1 and I-I cross sectional view of FIG. 12 in Embodiment 2)

FIG. 8 is a cross-sectional view of Embodiment 1 of the present invention, which measures the problem of FIG. 7 described above. FIG. 8 is the E-E cross section of FIG. 9, which shows the plan view of Embodiment 1. What makes FIG. 8 different from FIG. 7 is that a second interlayer insulating film 108 formed by an inorganic insulating film such as a silicon oxide or a nitride film is formed over the video signal line 12 and the source electrode 107. This second interlayer insulating film 108 can maintain stable insulation between the video signal line 12 and the source electrode 107 or the pixel electrode 111.

Figure 9:
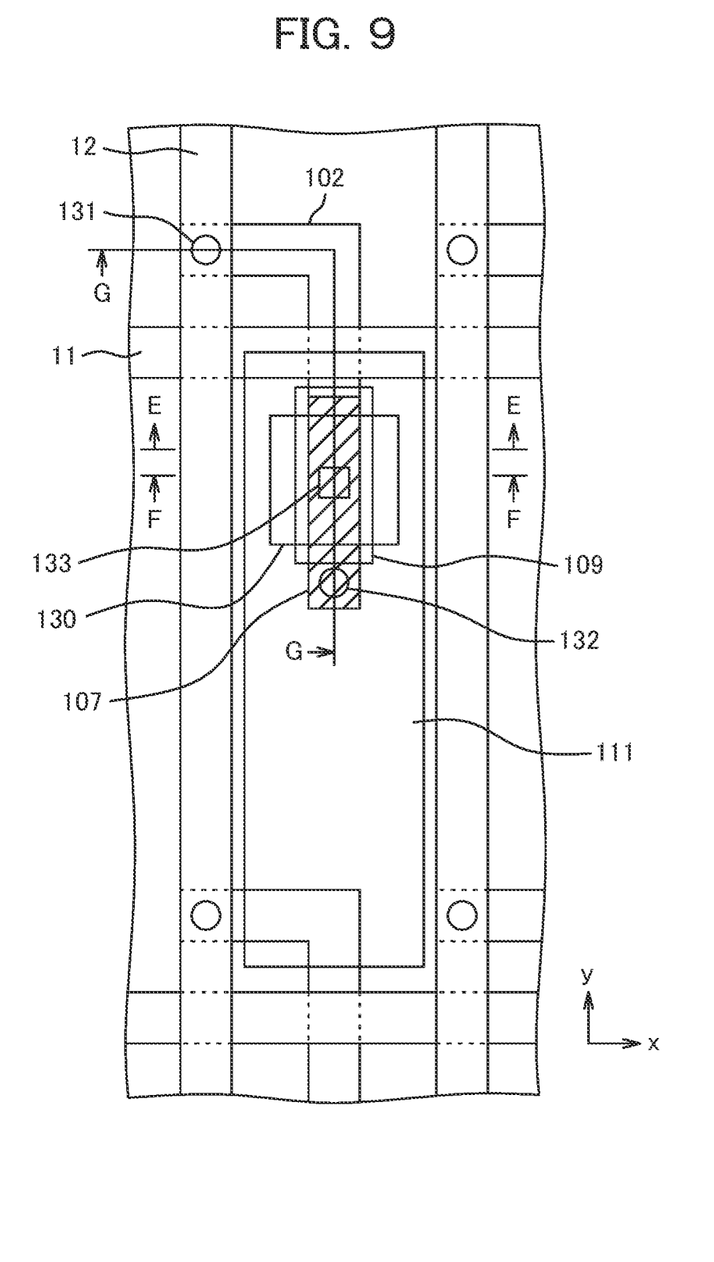
FIG. 9 is a plan view of the pixel portion of the liquid crystal display device according to Example 1.

FIG. 9 is a plan view of Embodiment 1. In FIG. 9, the second interlayer insulating film 108 described in FIG. 8 is not shown, but a relay electrode 109 formed on the second interlayer insulating film 108 is shown. In FIG. 9, the source electrode 107 is formed in a line parallel to the video signal line 12 to maintain a stable distance from the video signal line 12, and the line width of the source electrode 107 is as small as that of the semiconductor film 102. The through hole 132 connecting the source electrode 107 and the semiconductor film 102 is located outside of the through hole 130 formed in the organic passivation film 110. It extends under the second interlayer insulating film 108 and is connected to the relay electrode 109 through the through hole 133 formed in the second interlayer insulating film 108 in the through hole 130.

The relay electrode 109 is formed of an ITO film, which is a transparent conductive film. The relay electrode 109 is also formed in a line parallel to the video signal line 12 and extends parallel to the linear source electrode 107, but the width of the relay electrode 109 is larger than that of the source electrode 107. In other words, the relay electrode 109 can maintain insulation with the video signal line 12 due to the presence of the second interlayer insulating film 108, so that its width can be increased. This can stabilize the connection with the pixel electrode 111. In FIG. 9, the overlapped area of the source electrode 107 and the relay electrode 109 is hatched. The other configurations in FIG. 9 are the same as those described in FIG. 4.

Figure 10:
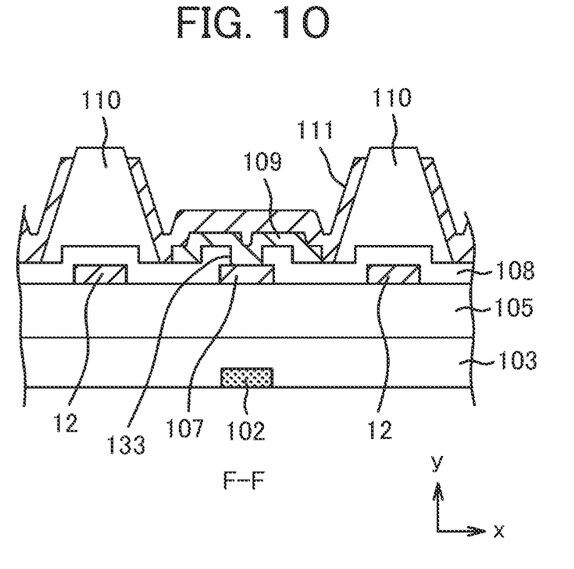
FIG. 10 is a F-F cross-sectional view of FIG. 9.

FIG. 10 is an F-F cross-sectional view of FIG. 9. The difference between FIG. 10 and FIG. 8 is that the cross-section shown in FIG. 10 includes a through hole 133 connecting the source electrode 107 and the relay electrode 109. In other words, in Embodiment 1, the through hole 133 is present within the through hole 130.

Figure 11:
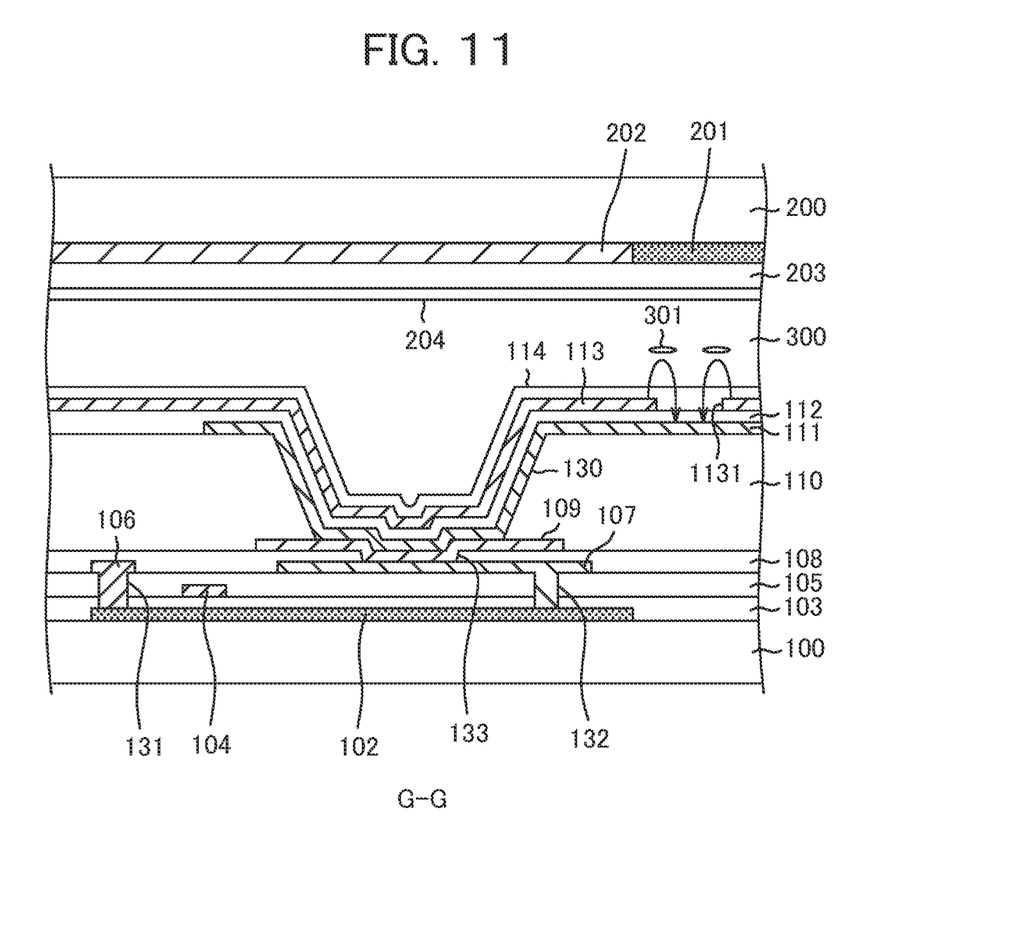
FIG. 11 is a G-G cross-sectional view of FIG. 10.

FIG. 11 is a G-G cross-sectional view of FIG. 9. In FIG. 11, the through hole 132 connecting the source electrode 107 and the semiconductor film 102 is located outside of the through hole 130 formed in the organic passivation film 110. The source electrode 107 extends from the through hole 132 to the left.

In FIG. 11, the second interlayer insulating film 108 made of inorganic insulating film is formed over the source electrode 107. The second interlayer insulating film 108 ensures insulation between the video signal line 12 and the source electrode 109. In the second interlayer insulating film 108, the through hole 133 is formed in the through hole 130, and the source electrode 109 and the relay electrode 109 are connected. The other configuration is the same as that described in FIG. 3.

According to the configuration of Embodiment 1, by covering the video signal line 12 and the source electrode 107 with the second interlayer insulating film 108 formed with an inorganic insulating film, the insulation between the video signal line 12 and the source electrode 107 can be securely maintained even when the pixel pitch is small. Also, by using the relay electrode 109, the connection between the pixel electrode 111 and the source electrode 107 can be ensured even if the inside of through hole 130 has a complicated structure.

Embodiment 2

As the horizontal pitch of the pixel decreases, the width of the video signal line 12 also decreases. For example, if the horizontal pixel pitch is approximately 8 μm, the width of the video signal line 12 is approximately 1.7 μm, for example. When the width of the video signal lines 12 becomes narrower, the electrical resistance increases and the signal writing speed decreases. To prevent this, a thickness of the video signal line 12 must be increased. The thickness of the video signal line 12 is approximately 700 nm, for example. Since the source electrode 107 is formed at the same time as the video signal line 12, it has the same thickness as the video signal line 12.

In the configuration of Embodiment 1, the thick source electrode 107 extends into the through hole 130 formed in the organic passivation film 110, so that the unevenness in the through hole 130 becomes severe, and the connection of the source electrode 107, the relay electrode 109, and the pixel electrode 111 may become problematic. In addition, a step is formed by the thick source electrode 107, and there is a risk of insulation failure due to breakdown of the insulation film.

Figure 12:
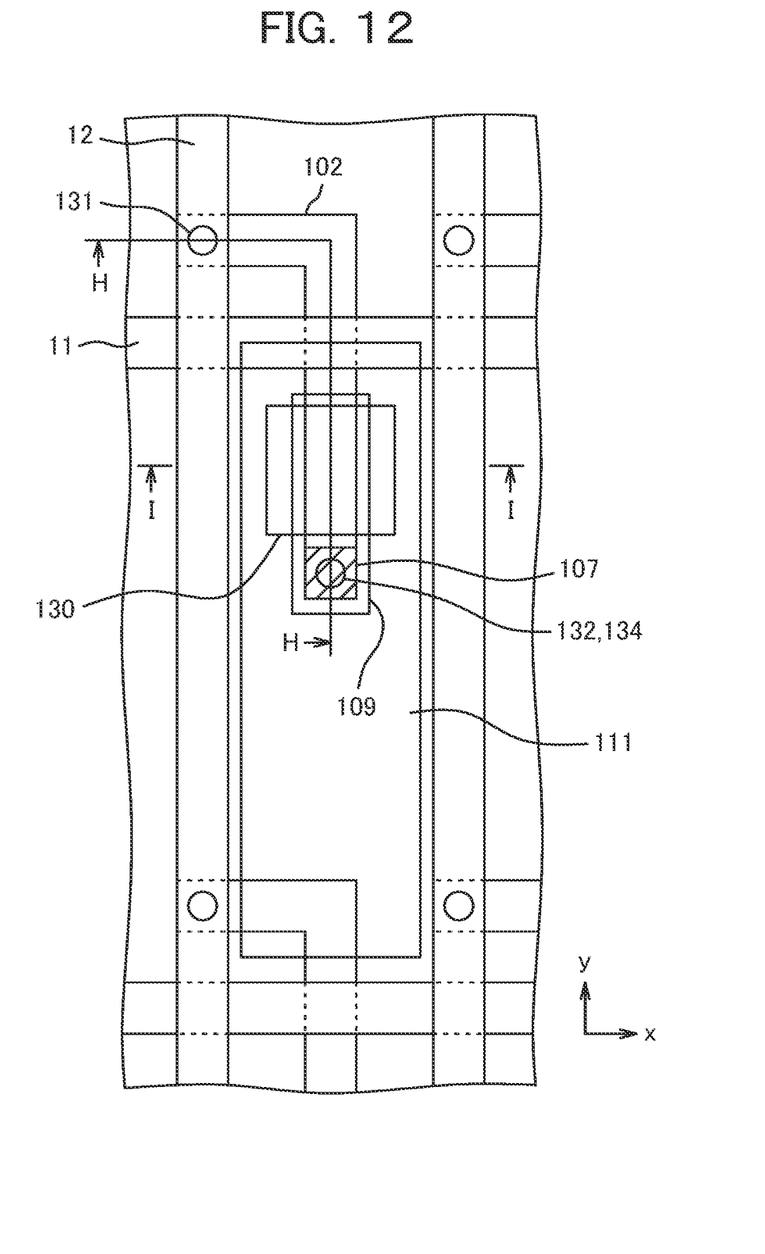
FIG. 12 is a plan view of the pixel section of the liquid crystal display device according to Example 2.

Therefore, in Embodiment 2, the source electrode 107 is configured not to extend into the through hole 130, so that the connection between the pixel electrode 111 and the relay electrode 109 is not affected. FIG. 12 is a plan view of a pixel according to Embodiment 2. The point where FIG. 12 differs from FIG. 9 showing Embodiment 1 is that a through hole 134 connecting the source electrode 107 and the relay electrode 109 exists outside of the through hole 130 formed in the organic passivation film 110. This improves the reliability of the connection between the relay electrode 109 and the pixel electrode 111 because the thick source electrode 107 is no longer present in the through hole 130.

In FIG. 12, the through hole 132 connecting the source electrode 107 and the semiconductor film 102 and the through hole 134 connecting the source electrode 107 and the relay electrode 109 are formed in the same location in a plan view. Therefore, the source electrode 107 formed with a thick metal film can be limited to a small area. In FIG. 12, the area indicated by hatching is the area where the source electrode 107 and the relay electrode 109 are formed in overlap. The other configurations in FIG. 12 are the same as those in FIG. 9.

Figure 13:
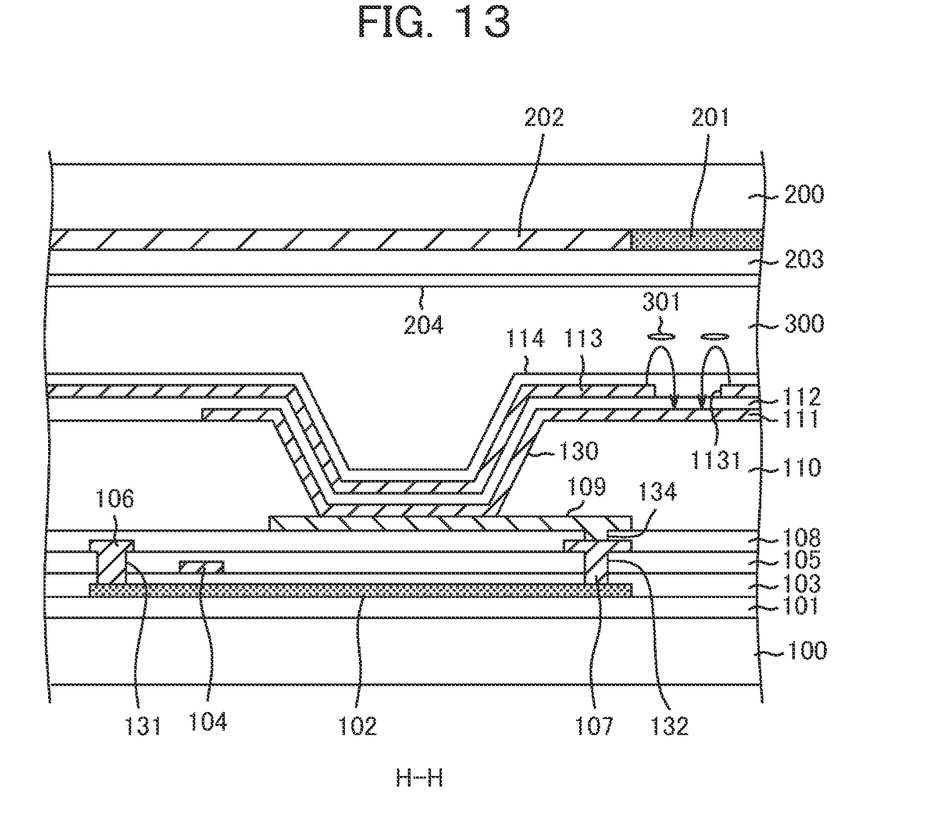
FIG. 13 is a H-H cross-sectional view of FIG. 12.

FIG. 13 is an H-H cross-sectional view of FIG. 12. The point where FIG. 13 differs from FIG. 11 in Embodiment 1 is that the through hole 134 through which the source electrode 107 and the relay electrode 109 are connected is formed outside of the through hole 30. Only the relay electrode 109 extends inside the through hole 130 and is connected to the pixel electrode 111. The bottom surface of the through hole 130 in FIG. 13 is flatter than the bottom surface of the through hole 130 in FIG. 11. This increases the reliability of the connection.

In FIG. 13, the through hole 132 connecting the source electrode 107 and the semiconductor film 102 and the through hole 134 connecting the source electrode 107 and the relay electrode 109 are formed in overlapping positions. Therefore, the source electrode 107 is kept in a very small area. In other words, the influence of steps, etc. of the source electrode 107, which is thickly formed by metal, is limited to only a limited area. Other configurations in FIG. 13 are the same as those in FIG. 11 of Embodiment 1.

The I-I cross-sectional view in FIG. 12 is the same as that in FIG. 8. In other words, the through hole 134 does not exists in the through hole 130. Therefore, the connection between the relay electrode 109 and the pixel electrode can be more stabilized.

Embodiment 3

Figure 14:
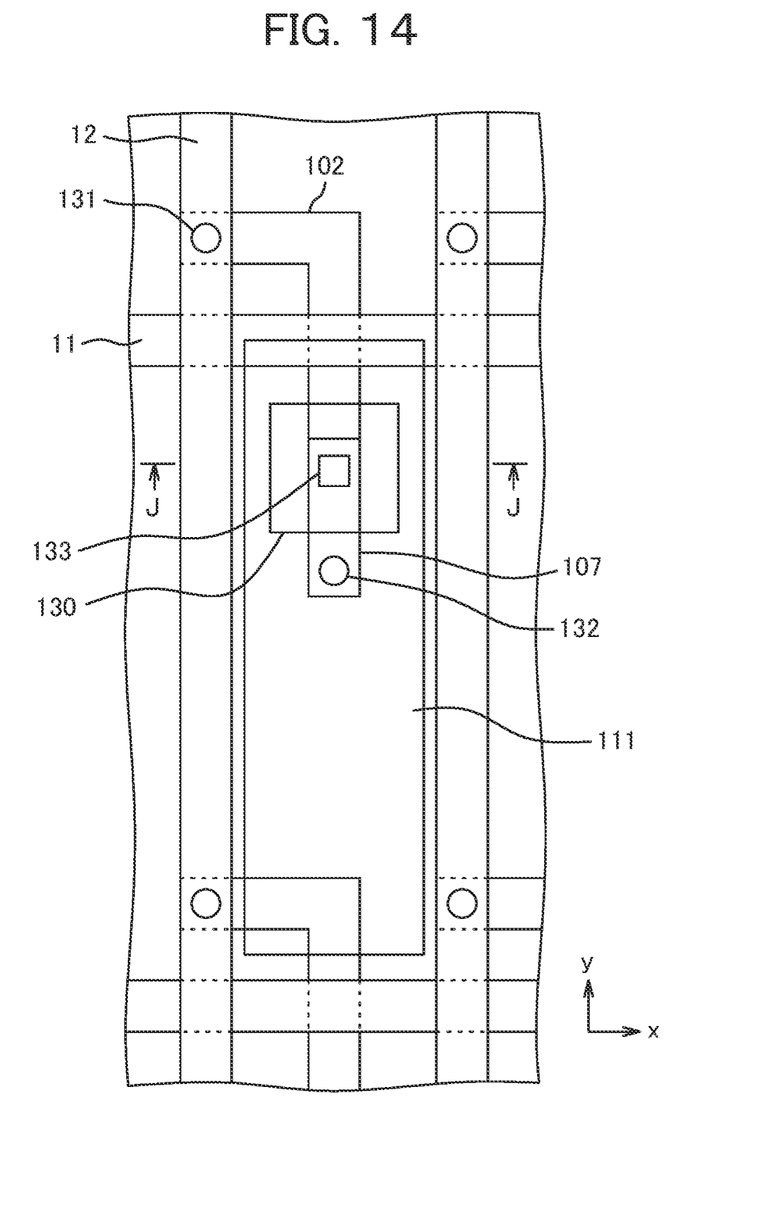
FIG. 14 is a plan view of the pixel portion of the liquid crystal display device according to Example 3.

In the configuration of Embodiment 1, if the film thickness of the source electrode 107 is not so large and there is no risk of forming large irregularities in the through hole 130, the relay electrode 109 formed with an ITO film can be omitted. FIG. 14 is a plan view of the pixel portion of Embodiment 3, showing this configuration. The difference between FIG. 14 and FIG. 9 of Embodiment 1 is that in FIG. 14, the relay electrode 109 is not present. Therefore, the source electrode 107 is directly connected to the pixel electrode 111 in the through hole 133 formed in the second interlayer insulating film 108.

Figure 15:
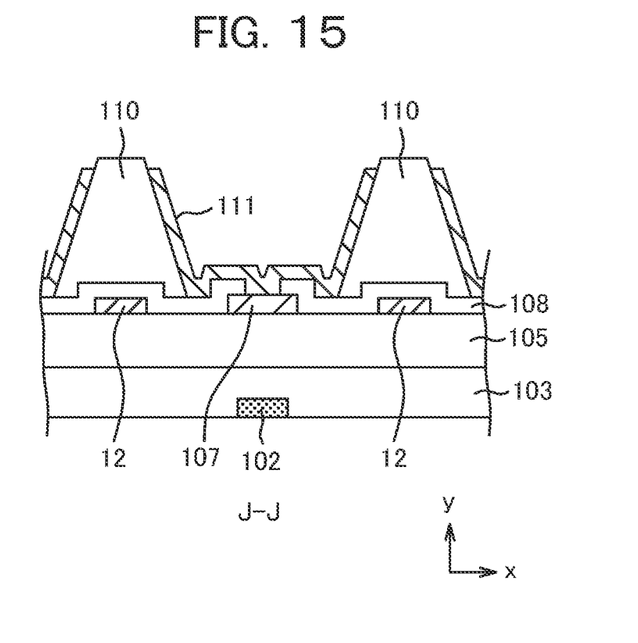
FIG. 15 is a J-J cross-sectional view of FIG. 14.

FIG. 15 is a J-J cross-sectional view of FIG. 14. The point where FIG. 15 differs from FIG. 10 in Embodiment 1 is that in FIG. 15, the relay electrode 109 is not formed between the pixel electrode 111 and the source electrode 107. Therefore, in the configuration of Embodiment 3, the process of forming the relay electrode 109 using an ITO film can be omitted. On the other hand, the effect on reliability due to the absence of the relay electrode 109 using ITO film is evaluated for each structure.

By the way, since the video signal line 12 and source electrode 107 are covered by the second interlayer insulating film 108 in Embodiment 3 as well, the problem of insulation between the video signal line 12 and the source electrode 107 or the pixel electrode 111 can be solved.

In the above embodiments, the case where the common electrode is above the pixel electrode is described, but the present invention can also be applied to a configuration where the pixel electrode is above the common electrode. In this case, a through hole is formed in the capacitance insulating film 112 within the through hole 130 formed in the organic passivation film 110, and the relay electrode 109 and the pixel electrode 111 are connected.

What is claimed is:

1. A liquid crystal display device comprising:
a thin-film transistor having a semiconductor film formed between a first video signal line and a second video signal line; and
a first end of the semiconductor film, the first end being connected to the first video signal line, and a second end of the semiconductor film, the second end being connected to a source electrode,
the first video signal line, the second video signal line, and the source electrode being present on a first interlayer insulating film,
the source electrode being connected to a pixel electrode and being present between the first video signal line and the second video signal line, wherein
a second interlayer insulating film is formed over the first video signal line, the second video signal line, and the source electrode,
a relay electrode connected to the source electrode is formed on the second interlayer insulating film,
an organic passivation film is formed over the second interlayer insulating film,
a capacitance insulating film is formed over the organic passivation film,
the pixel electrode, which is provided between the organic passivation film and the capacitance insulating film, is connected to the relay electrode in a first through hole formed in the organic passivation film,
the relay electrode maintains insulation with the first and second video signal lines due to the second interlayer insulating film, in order to increase a width of the relay electrode, and
a width of the relay electrode is larger than a width of the source electrode.

2. The liquid crystal display device according to claim 1:
characterized in that the source electrode extends within the first through hole formed in the organic passivation film, and a second through hole formed in the second interlayer insulating film, which connects the source electrode and the relay electrode, exists within the first through hole formed in the organic passivation film.

3. The liquid crystal display device according to claim 2:
characterized in that a third through hole formed in the first interlayer insulating film, which connects the source electrode and the semiconductor film, exists outside of the first through hole formed in the organic passivation film in a plan view.

4. The liquid crystal display device according to claim 2:
characterized in that a third through hole formed in the first interlayer insulating film, which connects the source electrode and the semiconductor film, exists inside the first through hole formed in the organic passivation film in a plan view.

5. The liquid crystal display device according to claim 1:
characterized in that the second through hole formed in the second interlayer insulating film, which connects the source electrode and the relay electrode, is formed outside of the first through hole formed in the organic passivation film, in a plan view, and the relay electrode extends inside of the first through hole formed in the organic passivation film.

6. The liquid crystal display device according to claim 5:
characterized in that the source electrode does not extend inside the first through hole formed in the organic passivation film.

7. The liquid crystal display device according to claim 1:
characterized in that the relay electrode is formed by indium tin oxide.

8. The liquid crystal display device according to claim 1:
characterized in that the second interlayer insulating film is formed of an inorganic insulating film,
the source electrode is formed in a line parallel to the video signal line, and
the relay electrode overlaps the source electrode and is formed in a line parallel to the source electrode.

* * * * *